United States Patent [19]
Djerf et al.

[11] Patent Number: 5,341,935
[45] Date of Patent: Aug. 30, 1994

[54] METHOD OF SEPARATING RESOURCE MATERIALS FROM SOLID WASTE

[75] Inventors: Tobin Djerf; Gwen Damico, both of Tyler, Tex.

[73] Assignee: Evergreen Global Resources, Inc., Tyler, Tex.

[21] Appl. No.: 61,285

[22] Filed: Apr. 29, 1993

[51] Int. Cl.$^5$ .............................................. B03B 9/06
[52] U.S. Cl. .......................................... 209/3; 209/11; 209/710
[58] Field of Search ...................... 209/3, 3.1, 11, 144, 209/474, 477, 695, 638

[56] References Cited

U.S. PATENT DOCUMENTS

| | | | |
|---|---|---|---|
| 3,599,788 | 8/1971 | Fufe et al. | 209/11 |
| 3,936,372 | 2/1976 | Frangiskos | 209/11 X |
| 4,506,835 | 3/1985 | Tsai | 209/3 X |
| 4,512,879 | 4/1985 | Attia et al. | 209/3 |
| 4,514,168 | 4/1985 | McMath et al. | 209/11 X |
| 5,061,735 | 10/1991 | Zielinski | 209/11 X |
| 5,126,058 | 6/1992 | Beckman | 209/11 X |

*Primary Examiner*—D. Glenn Dayoan
*Attorney, Agent, or Firm*—Ronald B. Sefrna

[57] ABSTRACT

A method of separating solid waste materials, in the form of dried particles of substantially uniform size, into constituent materials on the basis of density, with primary stage processing utilizing a series of fluidized bed and cyclonic separator assemblies to separate materials on the basis of density, followed by secondary stage processing utilizing combinations of vibratory conveyors, melt separation assemblies, and the like, is provided by the present invention. As the waste materials move through the separator assemblies the initial stream is further refined into a plurality of streams of increasingly specific densities as a result of air flow separation of lighter particles from heavier particles in each assembly. Further refined separation may be achieved through the use of vibratory conveyors, melt separation, and the like.

13 Claims, 6 Drawing Sheets

METHOD OF SEPARATING RESOURCE MATERIALS FROM SOLID WASTE

FIELD OF THE INVENTION

The present invention generally relates to the field of solid waste management and handling, and in its preferred embodiments more specifically relates to a method of separating particular constituents from a homogenous stream of solid waste materials.

BACKGROUND OF THE INVENTION

Recovery of materials from municipal and other solid waste for recycling and reuse is of increasing importance in modern society, and increasing attention has been given to efforts to devise efficient, economical, and workable approaches to recovery of recyclable and reusable materials from the waste stream. In the past, the most commonly used approach has been source separation, in which the generator of the waste materials separates useable or recyclable materials from other wastes before any of the waste materials are removed from the generation site. The reusable or recyclable materials are then further separated to a degree determined by the use or uses to which those materials may be put, or by the willingness of the waste generator to engage in increasingly detailed separation efforts.

In the particular case of municipal wastes, source separation of wastes must be done by each waste generating household, and the willingness of the waste generators to participate in detailed separation programs is often a significant determining factor in the effectiveness of the separation, or recycling program. In even the most effective voluntary recycling programs, participation by household waste generators in source separation of wastes at all is not universal, and participation tends to drop as the complexity of separation increases. Problems also arise from errors made by municipal waste generators in identifying materials, resulting in commingling of recovered materials and reduction in the efficiency of separation. In response to the commingling problem, and often in an effort to increase participation, some recycling programs have provided for a combination of source separation and collection separation approaches. In the combined programs reusable materials are separated from other wastes and initially commingled, with additional separation performed as the wastes are collected from each generator. However, combined programs tend to slow waste collection and often require additional manpower, and any improvement in efficiency has been marginal at best.

Another approach that has been used in municipal recycling programs, either along or in conjunction with separation by each waste generator, is post-collection separation, in which at least some part of the separation process is carried out after collection of wastes from individual households. Post-collection separation techniques range from simple and incomplete manual separation, based upon visual inspection of the waste stream and identification of recyclable materials, to more complex automatic systems utilizing techniques such as magnetic separation of ferrous metals, induction current separation of non-ferrous metals, and density separation in, e.g. water tanks. The effectiveness and efficiency of such separation techniques varies widely, and has proved to be only partially successful as an overall approach.

There remains a need in the field for a broadly applicable, effective, and economically efficient method of separating reusable and recyclable materials from solid wastes, especially but not necessarily limited to municipal wastes.

SUMMARY OF THE INVENTION

The present invention provides a method of separating a wide variety of constituent components from a solid waste stream in a continuous automatic process. The method of the invention may be used as the sole approach to separation and segregation of materials from a waste stream, or may readily be used in conjunction with source separation, combined source and collection separation, or preliminary post-collection separation techniques to recover materials either not addressed by or missed by preliminary separation techniques. In the preferred embodiment of the invention it is contemplated that ferrous metals have been previously separated from the waste stream, though separation of ferrous metals may readily be addressed in an alternative step of the method. It is further contemplated that the waste materials to be separated by the method of the invention have been initially shredded and ground to a uniform particle size and configuration, and have been thoroughly dried to remove free moisture from the materials. In a commercial use of the invention, waste materials may be reduced to uniform particles and dried prior to transportation to a facility designed to operate in accordance with the method of the invention, or the particle reduction and drying may be performed in an initial processing facility in physical proximity to the facility embodying the method of the present invention.

The method of the invention utilizes a series of fluidized beds and cyclonic separators to separate materials with air flow on the basis of density, utilizes vibratory conveyors to separate materials on the basis of density, and also contemplates the use of controlled temperature conveyor belts to separate plastic materials having generally similar densities but different melting points. The use of fluidized beds and cyclonic separators for density separation, with air as the separation fluid, eliminates the use of water in the separation process and also eliminates the use of wash water for cleaning of materials, thus eliminating the discharge or release of contaminated or polluted water. In the preferred embodiment of the method the air used for separation is recirculated in a generally closed system, essentially eliminating air pollution concerns as well.

In the practice of the method of the invention the prepared waste materials, previously ground to a generally uniform particle size and thoroughly dried, are fed to the fist of a series of fluid separation assemblies, each including a fluidized bed unit and a cyclonic separator unit. Separation air is forced into and through the fluidized bed unit of the first separator assembly at a controlled velocity from the bottom of the fluidized bed of waste materials to the top. As the air flows through the fluidized bed unit it encounters and lifts, or fluidizes, the discrete particles of waste material making up the bed, whereupon lighter particles are entrained in the air stream and carried from the top of the fluidized bed unit and introduced into the cyclonic separator of the first separation assembly in the series. Heavier materials fed to the first fluidized bed unit are not entrained in the air stream and fall to the bottom of the unit, where they are removed and routed to a vibratory conveyor unit of the first separation assembly. In the cyclonic separator of the first separation assembly air is forced into and through the cyclonic separator at a controlled velocity from the bottom of the separator to the top. Waste materials are fed into the air stream, and as the air encounters the discrete particles of waste material entering the separator, lighter particles are entrained in the air stream and carried from the top of the cyclonic separator and into a transition unit between the first and subsequent separation assemblies in the series. In the transition unit, which is of larger volume than the cyclonic separator, the velocity of the air leaving the cyclonic separator is reduced sufficiently for all entrained materials, except dust and fines, to drop out of the air stream. The particles of waste material are routed from the transition unit to a feed hopper for introduction to a subsequent separator assembly in the series. The air is routed from the transition unit through filters to remove the dust and fines, and the air is returned in a closed loop to the fluidized bed unit of the first separator assembly to repeat the path through the assembly. The dust and fines are recovered from the filters for disposal or use. Heavier materials in the stream fed to the first cyclonic separator unit from the first fluidized bed unit are not entrained in the air stream and fall to the bottom of the unit, where they are removed through an air lock and routed to the same vibratory conveyor carrying heavier materials from the fluidized bed unit.

Because the particles of waste are of generally uniform size, the division of the particles into an entrained stream and a non-entrained stream is based on the density of the particles, and both particle feed rate and velocity of the separating air may be controlled within specifically defined ranges so that each division of the particle stream may be made around a preselected density. Since the densities of waste materials are known and/or easily determined, the components present in each of the entrained and non-entrained streams can be determined and controlled with a reasonably high degree of accuracy. In the first separator assembly the entering stream of waste materials is divided into two streams; a heavy stream containing all materials with densities below the first separation value, and a light stream containing all materials with densities above that value. Each stream is further refined in subsequent separation assemblies until the desired degree of separation is achieved.

The heavier, i.e. higher density, material stream is carried from the first separation assembly by the conveyor and is routed to a second separation assembly, which also includes a fluidized bed unit and a cyclonic separator unit. The separation process performed in the second separator assembly is conceptually identical to the first separator assembly process, with modifications in equipment capacity and operating parameters appropriate to the material volume and density divisions to be achieved in the second separator assembly. In the second separator assembly the single stream of heavier particles from the first assembly has been further refined into two streams, each containing materials with densities above or below the control density established for the second separator assembly. Either or both of those streams may be further treated in subsequent separator assemblies, or may be routed to storage.

The stream of lighter materials from the first separator assembly is fed from the feed hopper to a third separator assembly, also including a fluidized bed unit and a cyclonic separator unit, where the materials are again separated by density into two exit streams. Either or both of those streams may be further separated in additional similar separator assemblies. After the final separator the velocity of the air stream is reduced in a final transition unit where particles with the lowest selected density are allowed to drop out of the air stream. The separation air is then passed through a filtering and the filtered air is returned to the beginning of the loop.

It will be understood that the air flow separation technique may be used to achieve a separation of a heterogenous stream of waste materials into a plurality of streams, each including materials with densities spanning a specific targeted range, and that the density range for each stream may be selected by modifying the operating parameters within each air flow separation assembly.

The particles removed from the bottom of each separator may be subjected to further separation processing, depending upon the composition of the respective bottoms stream and the intended use for the material in each bottom stream. The particular separation technique or techniques used to further separate components contained within each bottom stream is selected based upon the types of material involved. Particular techniques include, but are not limited to, magnetic separation, vibratory bed separation, and melt separation.

In the event the waste materials entering the separation process contain ferrous metals, and those metals are not removed prior to entry into the first cyclonic separator, the bottom materials in which ferrous metals have been deposited may be passed through a conventional magnetic separator unit to remove and recover the ferrous metals.

Vibratory conveyors may be used to separate materials of different densities that have been deposited in the same bottom stream or streams from one or more of the primary separators. In one approach to vibratory conveyor separation, a continuous conveyor, or each of a series of "end to end" conveyors, is inclined across the width of the conveyor so that one edge is raised above the opposite edge, vibratory motion is transmitted from a vibrator motor to the conveyor or conveyors. Material is continuously fed onto the front end of the conveyor at the elevated edge. As the conveyor moves, carrying the material along the length of the conveyor, heavier (i.e., more dense) material moves across the width of the conveyor more rapidly than does lighter material, in response to gravitational forces, and is allowed to drop from the edge of the conveyor. Since the particles fed onto the conveyor are of uniform size, the movement of the particles across the conveyor, and thus the location at which particles drop from the conveyor, is a function of density. Material particles dropping from the conveyor at different points along the length of the conveyor are collected and routed to further processing stages or stored.

Other techniques, such as melt separation, are used to further separate materials, such as different types of plastics, that have similar densities but different melting points. In melt separation the material to be separated is fed onto a series of conveyors in a thin layer essentially one particle thick, with each conveyor in the series heated to a temperature generally equal to the melting temperature of a specific type of plastic. Plastic materials with the lowest melting point being to melt when placed in contact with the first conveyor and the particles of that type of plastic adhere to the conveyor. As the first conveyor turns over the final roller to begin the return portion of the conveyor loop, non-adhered particles fall from the first conveyor onto the second conveyor in the series and the adhered particles remain attached to the conveyor surface until they are mechanically removed by, e.g., a scraper blade. This sequence of steps is repeated with the second and subsequent conveyors at respectively higher temperatures until all the plastic materials have been separated and removed.

It will be understood that the method may be adapted within the scope of the invention to achieve various degrees of separation, in terms of both the overall separation results and the separation specificity that may be achieved within each phase or step of the method. The adaptations or adjustments may be made in response to the types of materials in the initial waste stream to accommodate parameters such as varying levels of preliminary separation, or in response to a selection of desired output materials and the degree of separation of those materials desired. For example, the operating parameters may be designed and adjusted to result in essentially complete separation and removal of heavy inorganic materials, such as metal and glass, and plastic materials for recycling, leaving the majority of compostable organic materials unseparated for routing to a composting operation. In a further example, paper materials may be removed for recycling in addition to the previously mentioned components. The method of the invention is designed to allow a wide range of operating parameter adjustment while using the same physical equipment to practice the method, providing an extremely flexible approach to material separation and resource recovery.

The steps and features of the method, as well as illustrations of equipment used in the practice of the method, will be described in more detail with reference to the accompanying drawing figures.

DETAILED DESCRIPTION OF THE PREFERRED EMBODIMENT

The method of the invention may be conceptually divided into two stages of material separation: 1) a primary separation stage, using forced air as the separation fluid, performed in a series of separator assemblies, each including a fluidized bed unit and a cyclonic separator unit. and 2) a secondary separation stage in which the primary material separation is further refined for separation and recovery of specific materials. It is contemplated that ferrous metals have been removed from the waste materials prior to introduction of the waste materials into a facility utilizing the method of the present invention, and the following description does not address steps for removing ferrous metals. Such initial processing is within the ability of those of normal skill in the art, and may readily be performed as an adjunct or addition to the described method if the materials to be separated have not been previously treated.

Figure 3:
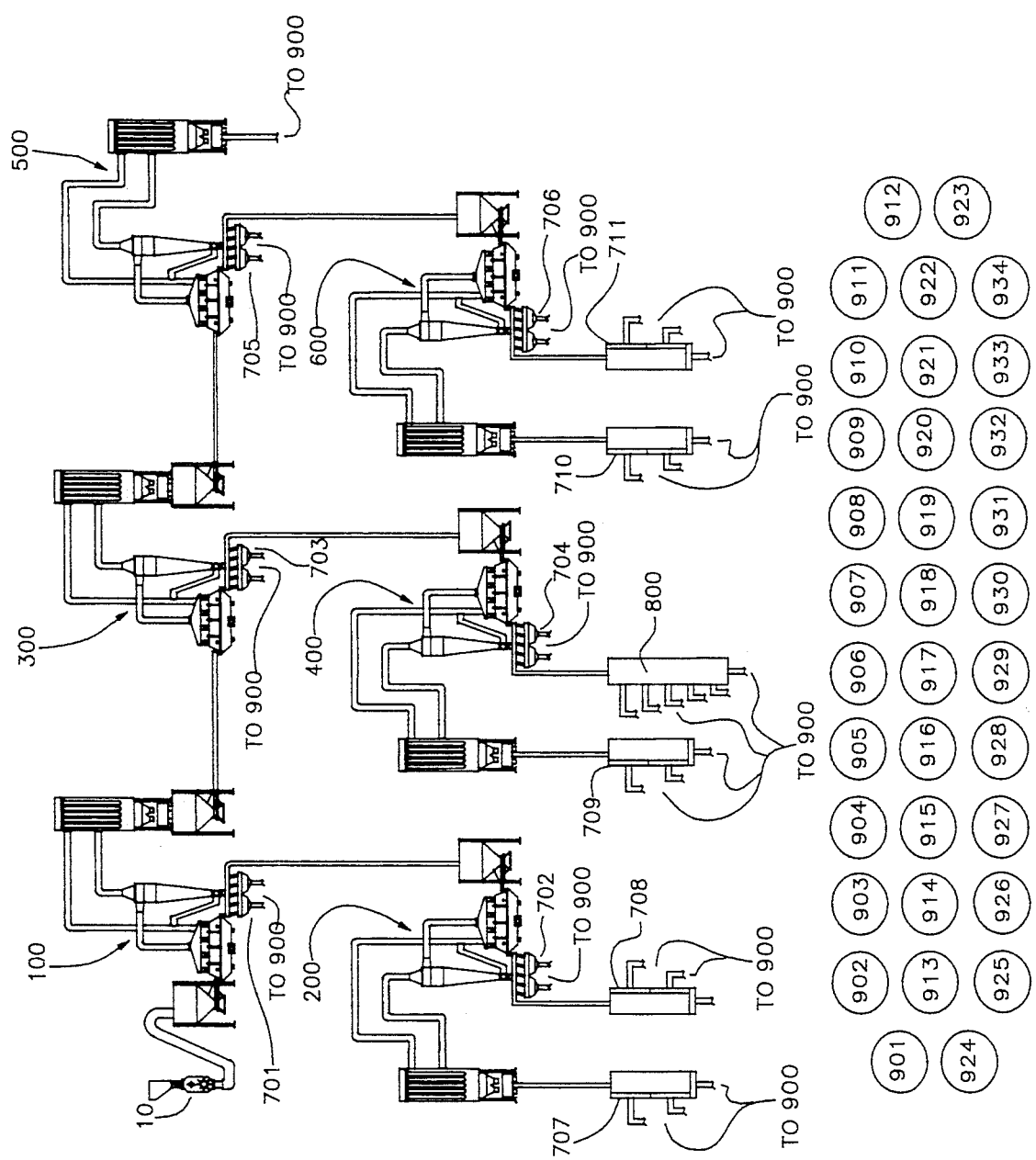
FIG. 3 is a partial schematic diagram of the preferred embodiment of the primary stage of the method of the invention, generally illustrating apparatus used to practice the primary separation stage steps of the method.

Solid waste materials to be processed in accordance with the preferred embodiment of the method of the invention enter the processing in the form of loose, dry particles of uniform dimension. The method of the invention is used to separate materials on the basis of density, and it is important for suitably effective performance of the method that the particles of waste material introduced for separation be essentially devoid of moisture, so that the particles may be separated on the basis of the density of the material itself without density alteration resulting from absorbed moisture. It is also important that the particles be of small size, uniform size, and uniform configuration. Each particle should be small enough in size, and thus of low enough weight, to be readily amenable to fluidization in a fluidized bed apparatus and to be amenable to entrainment in a stream of air moving a reasonable velocity consistent with the design of typical cyclonic separator apparatus. Uniformity of size is important so that all particles of a material having a certain particular density are of essentially identical mass, and separation of particles by mass effectuates separation by material density. The particles should be of uniform configuration so that each particle presents substantially the same cross-sectional area to an air stream in a fluidized bed apparatus or in a cyclonic separator apparatus. It is preferred that the waste materials be processed to suitable form prior to introduction to processing in accordance with the method of the present invention, as, for example, in accordance with the method disclosed in our co-pending application entitled "Method Of Treating And Preserving The Resource Value Of Solid Waste". However, in order to ensure proper particle preparation, the use of a preliminary grinder unit to reduce waste materials to uniform particles is contemplated, such as the unit depicted in FIG. 3 and designated by reference numeral 10.

Figure 1:
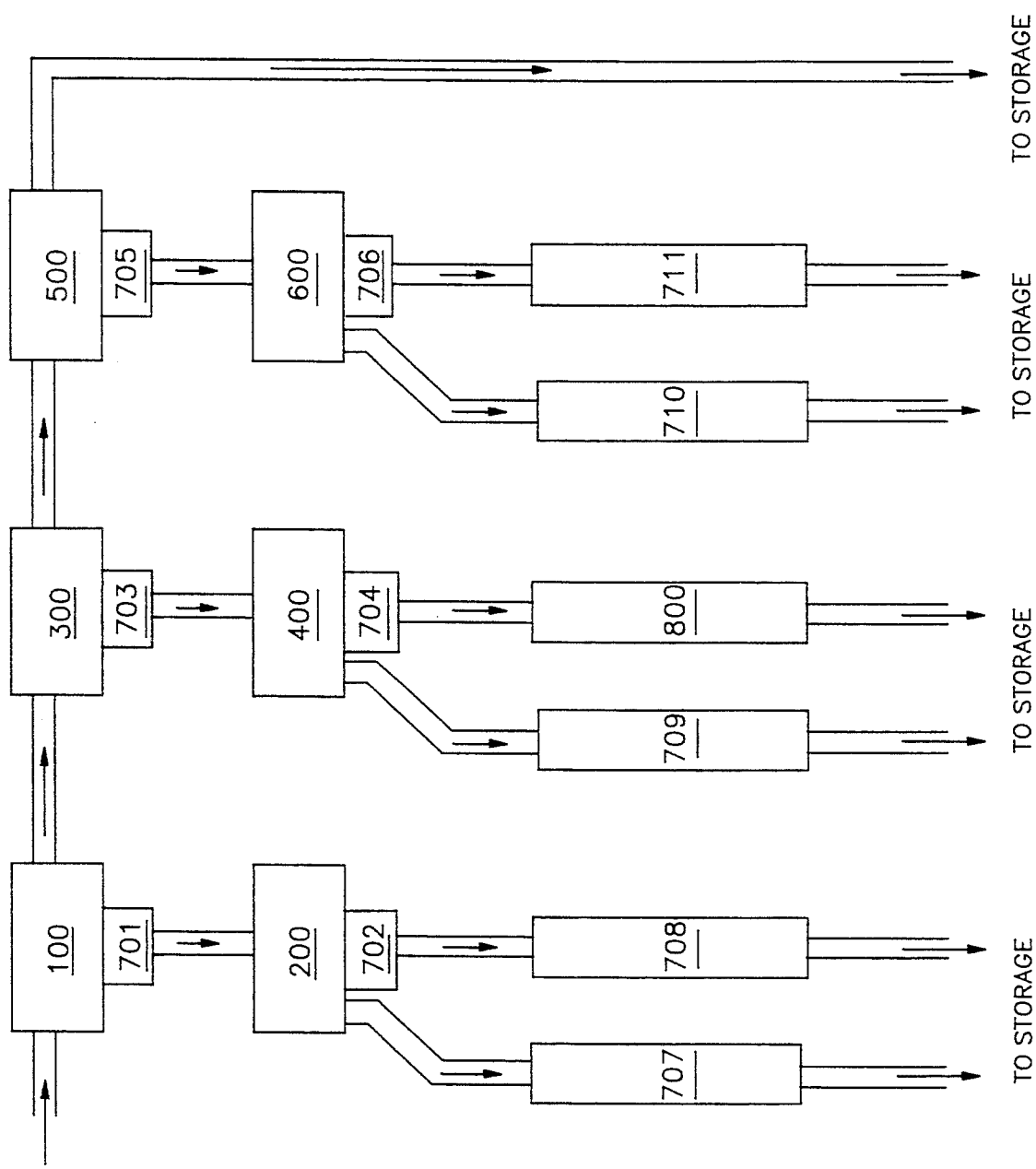
FIG. 1 is a schematic block diagram illustrating the primary and secondary separation stages of the method of the invention.
Figure 2:
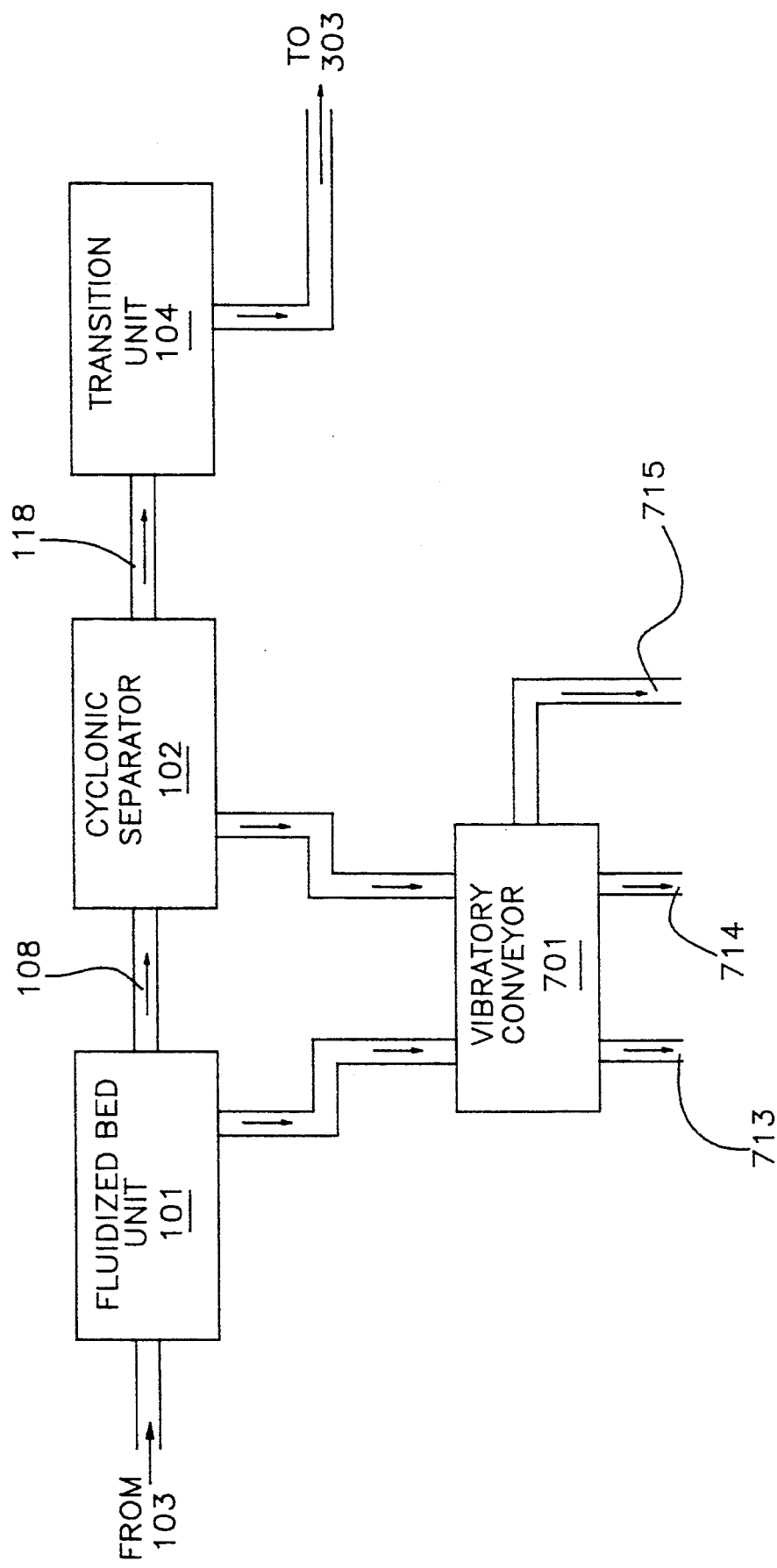
FIG. 2 is a schematic block diagram illustrating the steps of the preferred embodiment of the primary separation stage of the method of the invention.

Referring now to FIG. 1, a block diagram illustrating the flow of material through separation processing in accordance with the method of the invention, waste materials enter the processing in a single stream comprising a heterogenous mixture of all waste components. The waste materials are initially passed through a primary processing stage in which air flow is utilized for separation of the materials on the basis of density. The primary processing stage includes a plurality of air flow separator assemblies, each preferably comprising a fluidized bed unit and a cyclonic separator unit. In the first separator assembly, generally designated by reference numeral 100, the single incoming material stream is separated into three streams, a heavy stream including materials with densities below a preselected value, a light stream including materials with densities above a second preselected value, and an intermediate stream including materials with densities between the first and second values.

Following second stage processing on a vibratory conveyor, as described below, the remaining materials in the heavy and intermediate streams from the first separator assembly 100 are combined and routed to a second separator assembly 200. In the second separator assembly, which also includes a fluidized bed unit and a cyclonic separator unit, the entering waste materials are further separated into three streams by density; a heavy stream, a light stream, and an intermediate stream. Following second stage processing on a vibratory conveyor, the materials from the heavy and intermediate streams of the second separator assembly are routed to further secondary stage processing or to storage. The light stream from the second separator assembly is also routed to secondary stage processing or to storage.

The light stream of materials leaving the first separator assembly is fed to a third separator assembly 300, again preferably including a fluidized bed unit and a cyclonic separator unit, where the single stream of incoming materials is separated into a heavy stream, a light stream, and an intermediate stream. As with the heavy and intermediate streams from the first separator assembly, the heavy and intermediate streams from the third separator assembly may be subjected to second stage separation processing and recombined to enter a fourth separator assembly 400. The light stream of materials from the third separator assembly is fed to a fifth separator assembly 500. In the fourth separator assembly the materials are separated into three streams which may be further processed or sent to storage, similar to the treatment of the materials exiting the second assembly.

The light stream of materials from the third separator assembly is further separated in the fifth separator assembly 500 into three streams. The light stream from the fifth separator assembly is routed to storage, either directly or through a second stage separation unit. The heavy and intermediate streams from the third separator assembly are subjected to second stage separation, recombined, and fed to a sixth separator assembly 600. As in the previous assemblies, the single entry stream is divided into three streams of different densities, and each stream is routed through second stage separation or directly to storage.

Figure 4:
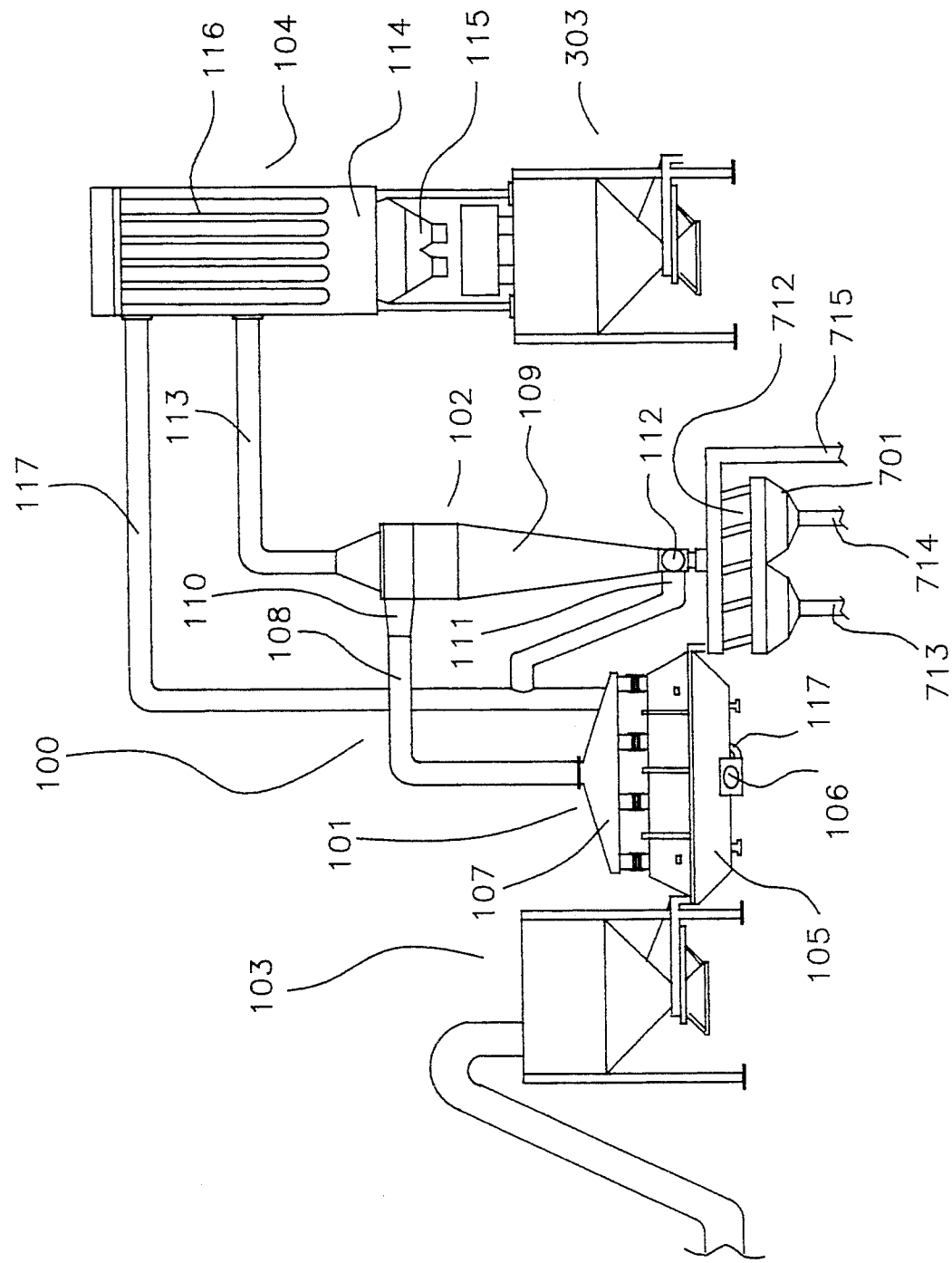
FIG. 4 is an illustration of a separator assembly suitable for use in practicing the method of the invention.

Each of the primary stage separator assemblies 100 through 600 is of the same general design, and includes a fluidized bed unit and a cyclonic separator unit. Referring to FIG. 4, illustrating separator assembly 100, the fluidized bed unit is designated by reference numeral 101 and the cyclonic separator unit is designed by numeral 102. Separator assembly 100 also includes material feed hopper 103 and transition unit 104 as major components. Fluidized bed unit 101 includes bed container 105, air inlet 106, collection hood 107, and material conduit 108. Cyclonic separator 102 includes body 109, material inlet 110, air inlet 111, air lock 112, and material conduit 113. Transition unit 104 includes chamber 114, material outlet 115, filters 116, and air return line 117.

Material entering separator assembly 100 is deposited in feed hopper 103 from which it is continuously fed into bed container 105 of fluidized bed unit 101. Air is forced into bed container 105 through air inlet 106 and is distributed within bed container 105 to flow upward through the bed of materials therein. As the air flows through the bed of materials the particles are lifted and lighter particles of waste material are entrained in the air stream and carried into collection hood 107 and on into material conduit 108, connected between fluidized bed unit 101 and cyclonic separator unit 102. Heavier materials confined in bed container 105 are not entrained in the air flowing through the bed and are dropped from the fluidized bed to exit from bed container 105.

Lighter materials carried in the air stream through conduit 108 enter cyclonic separator 102 through material inlet 110, and encounter a stream of air flowing through body 109 from air inlet 111. From the materials entering cyclonic separator 102, lighter materials are entrained in the cyclonic air stream and are carried from body 109 through conduit 113. Materials too heavy to be entrained in the air stream fall to the bottom of body 109 and are removed through air lock 112.

Air and entrained particles of the waste materials flow through conduit 113 into chamber 114 of transition unit 104. Chamber 114 is of sufficiently larger dimension that the air entering chamber 114 loses velocity, allowing the entrained particles to drop out of the air flow to the bottom of the chamber and exit transition unit 104 through material outlet 115. The exiting materials fall into hopper 303 of separator assembly 300. The air exits chamber 114 through filters 116, which remove dust and other fines from the air, and is conducted through air return line 117 to fluidized bed unit 101 in a closed loop.

Additional separator assemblies 200 through 600 are essentially identical in design to separator assembly 100, and the description of the components of separator assembly 100, identified by "100 series" reference numbers, is equally applicable to the components of separator assemblies 200 through 600. In addition to achieving effective separation of materials, the fluidized beds and cyclonic separators perform an effective cleaning function. It is generally necessary for recovered materials intended for recycling or reuse to be thoroughly cleaned after separation and recovery, and typical approaches use substantial volumes of water for cleaning. With the method of the invention the particles are suspended in and agitated by the air flow in both the fluidized bed units and, especially, in the cyclonic separator units, and that agitation results in repetitive collisions of particles with each other and with the unit structures. As a result of those collisions the particles are abraded and the particles surfaces are thoroughly cleaned during the movement of the particles through the apparatus. The dust and other fine contaminant particles produced from the cleaning are removed from the air stream by filters 116.

Figure 6:
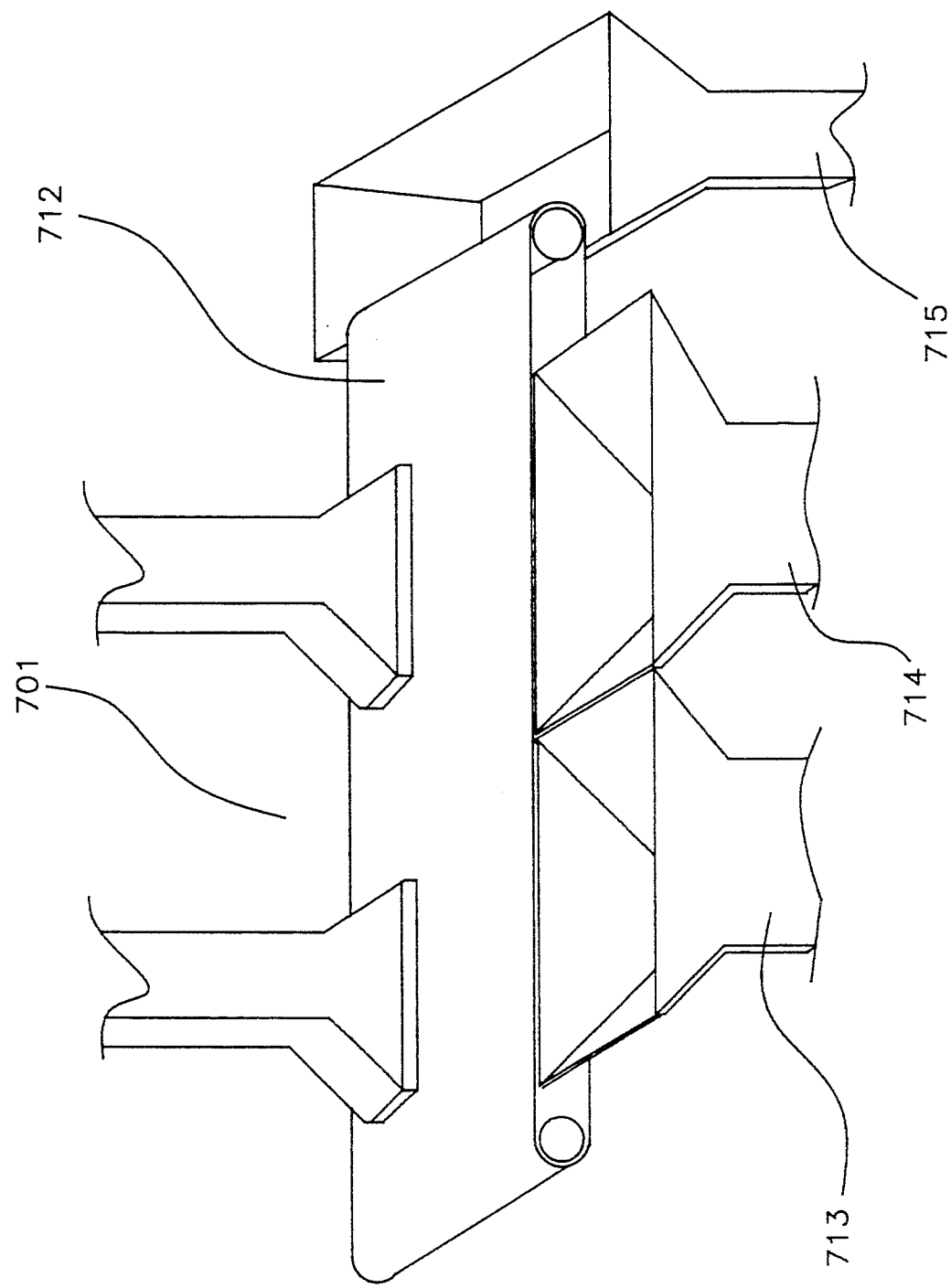
FIG. 6 is a schematic illustration of a vibratory conveyor separator suitable for use in practicing the method of the invention.

In the preferred embodiment of the invention the waste material that is not entrained in the air flow in the separator assemblies, such as assembly 100, forming the streams of heavier materials from fluidized bed unit 101 and cyclonic separator unit 102, are subjected to second stage processing before being introduced to a subsequent primary stage separator assembly, or to storage from the final primary stage separator assembly in the material flow path described above. In the preferred embodiment the initial second stage processing utilizes vibratory conveyors, such as the conveyor assembly generally designated by reference numeral 701 in FIG. 4 and in FIG. 6. FIGS. 4 and 6 the heavier material stream from fluidized bed unit 101 is placed on an inclined vibrating belt 712 at the beginning of the belt path. More dense material particles move across the incline, and fall from the belt, more rapidly than less dense materials, so the exit location along the length of the belt path is proportional to density. Materials removed from cyclonic separator 102 through air lock 112 are lower in density than the materials placed on the belt from fluidized bed 101 and are placed on belt 712 farther along the belt path, at a location where the densities of those materials generally matches the densities of the materials remaining on the belt at the entry location. The materials falling from the edge of the belt are collected in density zones and routed to storage through, e.g., conduits 713 and 714. Materials of sufficiently low density to remain on the belt through the full belt path are routed to the next sequential primary stage separator assembly through conduit 715, or to storage from the final assembly in the sequence.

Streams of separated material exiting from the primary stage separation assemblies for storage may also be subjected to further second stage separation processing in addition to the vibratory conveyor secondary separation between assemblies. Further vibratory belt separation units, illustrated as units 702 through 711 in FIG. 3, may be used as described above to further refine the density separation of the materials before final storage, or use, of the materials, or other separation techniques may be utilized. Each of vibratory separation units 702 through 711 includes the same general components described above for unit 701.

Figure 5:
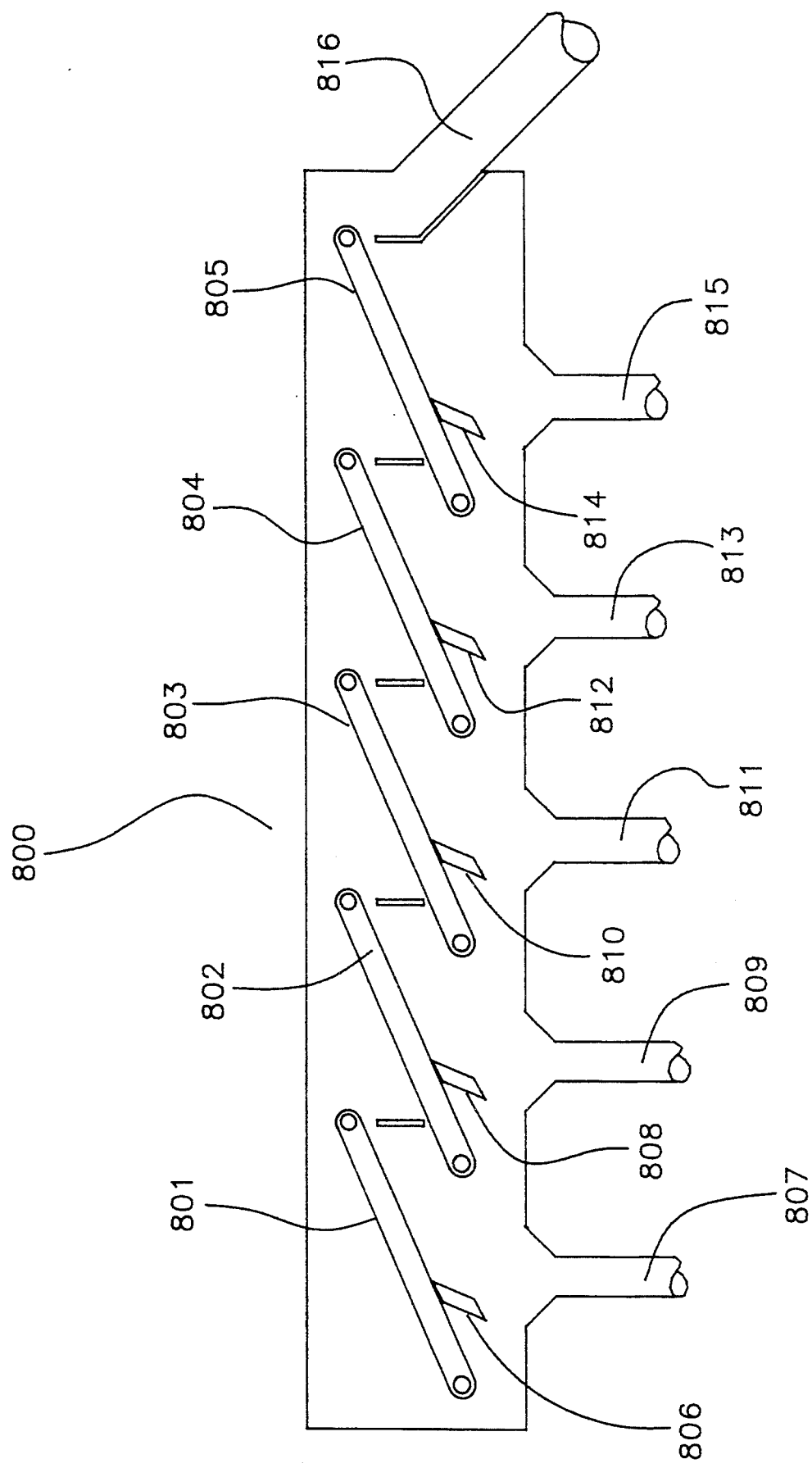
FIG. 5 is a schematic illustration of a melt separation step of the method of the invention.

In the preferred embodiment of the method of the invention second stage separation in the form of "melt separation" is used to further separate plastic materials of differing chemical composition, based upon melting point. As schematically illustrated in FIG. 5, a melt separation unit, generally designated by reference numeral 800, comprises a series of heated belts 801 through 805. Each such belt is heated on its upper surface to a specific temperature selected to match the melting point of a particular plastic type, such as polyvinyl chloride, high density polyethylene, etc. Belt 801 is heated to the lowest temperature, belt 805 is heated to the highest temperature, and the intermediate belts heated to sequentially increasing intermediate temperatures. In general, different types of plastics, though they may have very similar densities, have different melting temperatures, so one particular plastic type will melt at the temperature at which each belt is maintained, but will not melt at lower temperatures. A stream of particles of mixed plastics or including mixed plastics is conveyed to unit 800 and placed on moving belt 801 in a single layer so that each particle is in contact with the belt surface. As the materials are carried by belt 801 the particles of plastic with a melting point at the temperature of belt 801 begin to melt and adhere to the surface of the belt. When the belt moves over its upper roller all non-adhered materials fall from belt 801 to belt 802, while the adhered particles remain on belt 801 as it begins the return portion of the continuous loop path followed by each segment of the belt. The belt surface is allowed to cool slightly after passing over the upper roller, to a temperature below the melting point of the adhered plastic, allowing the particles to re-solidify. The particles are removed from belt 801 by scraper 806 and exit the unit through conduit 807. The same sequence of surface melting, adhesion, cooling, and removal of particles of particular plastic types is repeated on each of the subsequent belt assemblies, with the separated plastic exiting unit 800 through conduits 809, 811, 813, and 815 in addition to 807. Remaining materials exit the separation unit through conduit 816. Since the particles of material processed in accordance with the method of the invention have been thoroughly cleaned in the primary stage separation assemblies, the plastic particles exiting melt separation unit 800 are clean and each plastic material stream is free of contaminating materials. The plastic materials may thus be used without further cleaning, and the cost and pollution concerns associated with washing and other cleaning techniques are eliminated.

Separated materials from the primary and secondary separation stages are routed to storage in silos, or other appropriate storage units, 901 through 934, for subsequent use or sale.

The foregoing description of the method of the invention and of apparatus associated with the practice of the method of the invention is illustrative and not for purposes of limitation. The invention is susceptible to a number of variations and alternative embodiments within the scope of the invention as claimed.

What is claimed is:

1. A method of separating resource materials of preselected composition from a heterogenous mixture of materials, with the materials in such mixture in the form of dry, loose particles of uniform size and configuration, comprising the steps of introducing the heterogenous mixture of materials to a first fluid flow separator assembly and passing separation fluid through said first fluid flow separator assembly in streams of predetermined flow rates and velocities so as to divide such mixture of materials into a first stream of particles of highest density, a first stream of particles of lowest density, and a first stream of particles of intermediate density;

combining said first stream of particles of highest density and said first stream of particles of intermediate density into a first combined stream;

introducing said first combined stream into a second fluid flow separator assembly and passing separation fluid through said second fluid flow separator assembly in streams of predetermined flow rates and velocities so as to entrain divide said first combined stream into a second stream of particles of highest density, a second stream of particles of lowest density, and a second stream of particles of intermediate density;

combining said second stream of particles of highest density and said second stream of particles of intermediate density into a second combined stream;

introducing said first stream of particles of lowest density to a third fluid flow separator assembly and passing separation fluid through said third fluid flow separator assembly in streams of predetermined flow rates and velocities so as to entrain divide such mixture of materials into a third stream of particles of highest density, a third stream of particles of lowest density, and a third stream of particles of intermediate density;

combining said third stream of particles of highest density and said third stream of particles of highest density and intermediate density, respectively, into a third combined stream;

introducing said third combined stream into a fourth fluid flow separator assembly and passing separation fluid through said fourth fluid flow separator assembly in streams of predetermined flow rates and velocities so as to entrain divide said first combined stream into a fourth stream of particles of highest density, a fourth stream of particles of lowest density, and a fourth stream of particles of intermediate density;

combining said fourth stream of particles of highest density and said fourth stream of particles of intermediate density into a fourth combined stream;

introducing said third stream of particles of lowest density to a fifth fluid flow separator assembly and passing separation fluid through said fifth fluid flow separator assembly in streams of predetermined flow rates and velocities so as to entrain divide such mixture of materials into a fifth stream of particles of highest density, a fifth stream of particles of lowest density, and a fifth stream of particles of intermediate density;

combining said fifth stream of particles of highest density and said fifth stream of particles of highest density and intermediate density, respectively, into a fifth combined stream;

introducing said fifth combined stream into a sixth fluid flow separator assembly and passing separation fluid through said sixth fluid flow separator assembly in streams of predetermined flow rates and velocities so as to divide said first combined stream into a sixth stream of particles of highest density, a sixth stream of particles of lowest density, and a sixth stream of particles of intermediate density;

combining said sixth stream of particles of highest density and said sixth stream of particles of intermediate density into a sixth combined stream;

routing said fifth stream of particles of lowest density for use or storage of such materials;

introducing said second combined stream, from said second fluid flow separator assembly, to a first secondary stage separator assembly and dividing said second combined stream into a plurality of final particle streams each including particles having densities within a preselected discrete range, and routing each of said final particle streams from said first secondary stage separator assembly for use or storage;

introducing said fourth combined stream, from said fourth fluid separator assembly, to a second secondary stage separator assembly and dividing said fourth combined stream into a plurality of final particle streams each including particles having densities within a preselected discrete range, and routing each of said final particle streams from said second secondary stage separator assembly for use or storage;

introducing said sixth combined stream, from said sixth fluid flow separator assembly, to a third secondary stage separator assembly and dividing said sixth combined stream into a plurality of final particle streams each including particles having densities within a preselected discrete range, and routing each of said final particle streams from said third secondary stage separator assembly for use or storage.

2. The method of claim 1, including the additional steps of introducing each of said streams of particles of highest density and each of said streams of particles of intermediate density to a vibratory separator assembly and recovering, for use or storage, particles of materials of preselected density ranges from said streams prior to combining the remainder of said streams into said combined stream.

3. The method of claim 1, wherein each of said fluid flow separator assemblies includes a fluidized bed unit and a cyclonic separator unit.

4. The method of claim 1, wherein said separation fluid is air.

5. The method of claim 1, wherein the flow of said separation fluid in each of said fluid flow separator assemblies is in a closed loop within the respective fluid flow separator assembly.

6. The method of claim 5, including the additional steps of removing dust and the like from said separation fluid in each of said fluid flow separator assemblies after passage of said separation fluid through said particles of material.

7. The method of claim 1, wherein said steps of dividing combined streams into a plurality of final particle streams includes the additional steps of placing the combined stream on an elongate conveyor inclined across the width of the conveyor with one edge at a lower elevation than the opposite edge;

causing said conveyor to vibrate, thereby agitating the particles of material comprising the combined stream and causing said particles to move across the width of said conveyor at a rate of movement proportional to the density of said particles such that particles of higher density move across and fall from said conveyor before particles of lower density move across and fall from said conveyor;

collecting particles falling from said conveyor into discrete particle streams determined by the portion of the length of the conveyor from which such particles fall, each of said discrete particle streams including particles having densities within a preselected range; and routing each of said discrete particle streams to use or storage.

8. The method of claim 1, wherein at least one of said combined streams includes similar materials with differing melting points and wherein at least one of said steps of dividing said fourth combined stream into a plurality of final particle streams includes the further steps of placing said combined stream on a first conveyor belt heated to a first temperature equal to the melting point of a first of the materials to be separated thereby and allowing such first material to partially melt and adhere to said first conveyor belt, dropping non-adhered materials from said first conveyor belt to a second conveyor belt, removing the adhered material from said first conveyor belt, and recovering such material for use or storage;

heating said second conveyor belt to a second temperature equal to the melting point of a second of the materials to be separated thereby and allowing such second material to partially melt and adhere to said second conveyor belt, dropping non-adhered materials from said second conveyor belt to a third conveyor belt, removing the adhered material from said second conveyor belt, and recovering such material for use or storage; and repeating the step of heating, partially melting and adhering, dropping non-adhered material, removing adhered material, and recovering such material, for each of the materials to be separated by such process.

9. The method of claim 8, wherein said two or more similar materials comprise plastics.

10. A method of separating a heterogenous mixture of materials of varying densities, with such materials in the form of particles of uniform size and configuration, into a plurality of streams of materials with each stream including materials with densities falling within a preselected range, using separation apparatus including a plurality of air flow separation units each to divide an incoming material particle stream on the basis of density by entraining and removing in an air stream particles of materials with densities below a preselected value, comprising the steps of introducing the mixture of materials to a first separation unit and dividing the materials into a first low density stream and a first high density stream;

introducing the first high density stream to a second separation unit and dividing the material of said first high density stream into a second low density stream and a second high density stream;

introducing the first low density stream to a third separation unit and dividing the material of said first low density stream into a third low density stream and a third high density stream;

collecting the materials in the second high density stream;

collecting the materials in the second low density stream;

introducing the third high density stream to a fourth separation unit and dividing the material of said third high density stream into a fourth low density stream and a fourth high density stream;

introducing the third low density stream to a fifth separation unit and dividing the material of said third low density stream into a fifth low density stream and a fifth high density stream;

collecting the materials in the fourth high density stream;

collecting the materials in the fourth low density stream;

collecting the materials in the fifth low density stream;

introducing the fifth high density stream to a sixth separation unit and dividing the material of said fifth high density stream into a sixth low density stream and a sixth high density stream;

collecting the materials in the sixth high density stream; and collecting the materials in the sixth low density stream.

11. The method of claim 10, wherein the separation apparatus further includes a plurality of vibratory separation units each to divide an incoming material particle stream into two or more outgoing streams on the basis of density by sequentially removing particles of materials with increasing densities, and wherein the method comprises the additional steps of introducing the second high density stream to a first vibratory separation unit and dividing the material of said second high density stream into a plurality of streams of material with each stream including materials having densities within a discrete preselected range, and collecting the materials in each of said plurality of streams;

introducing the fourth high density stream to a second vibratory separation unit and dividing the material of said fourth high density stream into a plurality of streams of material with each stream including materials having densities within a discrete preselected range, and collecting the materials in each of said plurality of streams; and introducing the sixth high density stream to a third vibratory separation unit and dividing the material of said fourth high density stream into a plurality of streams of material with each stream including materials having densities within a discrete preselected range, and collecting the materials in each of said plurality of streams.

12. The method of claim 11, wherein the separation apparatus further includes additional vibratory separation units each to divide an incoming material particle stream into two or more outgoing streams on the basis of density by sequentially removing particles of materials with increasing densities, and wherein the method comprises the additional steps of introducing the second low density stream to a fourth vibratory separation unit and dividing the material of said second low density stream into a plurality of streams of material with each stream including materials having densities within a discrete preselected range, and collecting the materials in each of said plurality of streams;

introducing the fourth low density stream to a fifth vibratory separation unit and dividing the material of said fourth low density stream into a plurality of streams of material with each stream including materials having densities within a discrete preselected range, and collecting the materials in each of said plurality of streams;

introducing the fifth low density stream to a sixth vibratory separation unit and dividing the material of said fifth low density stream into a plurality of streams of material with each stream including materials having densities within a discrete preselected range, and collecting the materials in each of said plurality of streams; and introducing the sixth low density stream to a seventh vibratory separation unit and dividing the material of said sixth low density stream into a plurality of streams of material with each stream including materials having densities within a discrete preselected range, and collecting the materials in each of said plurality of streams.

13. The method of claim 12, wherein at least one of the collected material streams includes two or more plastic materials of differing composition and with differing melting points, and wherein the method includes, for the purpose of separating each of such plastic materials from the collected stream, the further steps of placing the material stream including such plastic materials on a first conveyor belt heated to a first temperature equal to the melting point of a first of the plastics to be separated thereby and allowing such first plastic material to partially melt and adhere to said first conveyor belt, dropping non-adhered materials from said first conveyor belt to a second conveyor belt, removing the adhered plastic material from said first conveyor belt, and recovering such material for use or storage;

heating said second conveyor belt to a second temperature equal to the melting point of a second of the plastic materials to be separated thereby and allowing such second plastic material to partially melt and adhere to said second conveyor belt, dropping non-adhered materials from said second conveyor belt to a third conveyor belt, dropping non-adhered plastic material from said second conveyor belt, and recovering such material for use or storage; and repeating the step of heating successive conveyor belts, partially melting and adhering a particular plastic material to the respective conveyor belt, dropping non-adhered material, removing adhered material, and recovering such material, for each of the plastic materials to be separated by such process.

* * * * *